United States Patent [19]

Acharya et al.

[11] Patent Number: 5,974,036
[45] Date of Patent: Oct. 26, 1999

[54] HANDOFF-CONTROL TECHNIQUE FOR WIRELESS ATM

[75] Inventors: Arup Acharya, North Brunswick; Jun Li, Piscataway; Dipankar Raychaudhuri, Princeton Junction, all of N.J.; Ruixi Yuan, Waltham, Mass.; Subir K. Biswas, Philadelphia, Pa.

[73] Assignee: NEC USA, Inc., Princeton, N.J.

[21] Appl. No.: 08/773,738

[22] Filed: Dec. 24, 1996

[51] Int. Cl.$^6$ .................................................... H04Q 7/00
[52] U.S. Cl. .......................... 370/331; 370/338; 455/436; 455/439; 455/442
[58] Field of Search .................................... 370/331, 351, 370/400, 338, 336, 328, 347, 395, 396, 493, 494, 496, 498, 522; 455/436, 439, 524, 525, 434, 435, 440, 442, 463, 92, 95

[56] References Cited

U.S. PATENT DOCUMENTS

| | | | |
|---|---|---|---|
| 4,485,486 | 11/1984 | Webb et al. | 455/450 |
| 5,345,448 | 9/1994 | Keskitalo | 455/437 |
| 5,434,853 | 7/1995 | Hemmady et al. | 370/60 |
| 5,487,065 | 1/1996 | Acampora et al. | 370/60.1 |
| 5,550,828 | 8/1996 | Gries et al. | 370/331 |
| 5,682,380 | 10/1997 | Park et al. | 370/331 |

OTHER PUBLICATIONS

L. Van Hauwermeiren et al., "Requirements for Mobility Support in ATM", Proceedings of Globecom 1994, pp. 1691–1695.

R. Yuan et al., "A Signaling and Control Architecture for Mobility Support in Wireless ATM Networks", IEEE International Conference on Communications, Jun. 1996, pp. 478–484.

J.Z. Wang, "A Fully Distributed Location Registration Strategy for Universal Personal Communication Systems", IEEE Journal on Selected Areas in Communications, vol. 11, No. 6, Aug. 1993, pp. 850–860.

Dipankar Raychaudhuri et al., "ATM–Based Transport Architecture for Multiservices Wireless Personal Communication Networks", IEEE Journal On Selected Areas in Communications, vol. 12, No. 8, Oct. 1994, pp. 1401–1414.

D. Raychaudhuri et al. "Multimedia Transport in Next–Generation Personal Communication Networks", Proc. Int'l Conference on Communications 1994, pp. 858–862.

A.S. Acampora et al., "An Architecture and Methodology for Mobile–Executed Handoff in Cellular ATM Networks", IEEE Journal on Selected Areas of Communications, vol. 12, No. 8, 1994.

*Primary Examiner*—Dang Ton
*Assistant Examiner*—Phirin Sam
*Attorney, Agent, or Firm*—Sughrue, Mion, Zinn Macpeak & Seas, PLLC

[57] ABSTRACT

Mobility in a wireless ATM network is accomplished by use of hand-off control protocols. A mobile terminal signals a first base station that a hand-off is to occur. In a first preferred embodiment the first base station signals a second base station requesting a hand-off. After the second base station signals the first base station that a datapath link is available from a hand-off switch to the second base station, the hand-off switch causes the datapath to change from the first base station to the second base station and the first base station signals the mobile terminal to commence communication with the second base station. In a second preferred embodiment, the mobile terminal signals a first base station that a hand-off is to occur. The first base station signals a second base station requesting a hand-off. At the same time a datapath link is established between the first and second base stations. When the second base station signals the first base station that the datapath link is available, the first base station signals the mobile terminal to change to the second base station and data is sent from the first base station to the second base station via the available established datapath link.

4 Claims, 11 Drawing Sheets

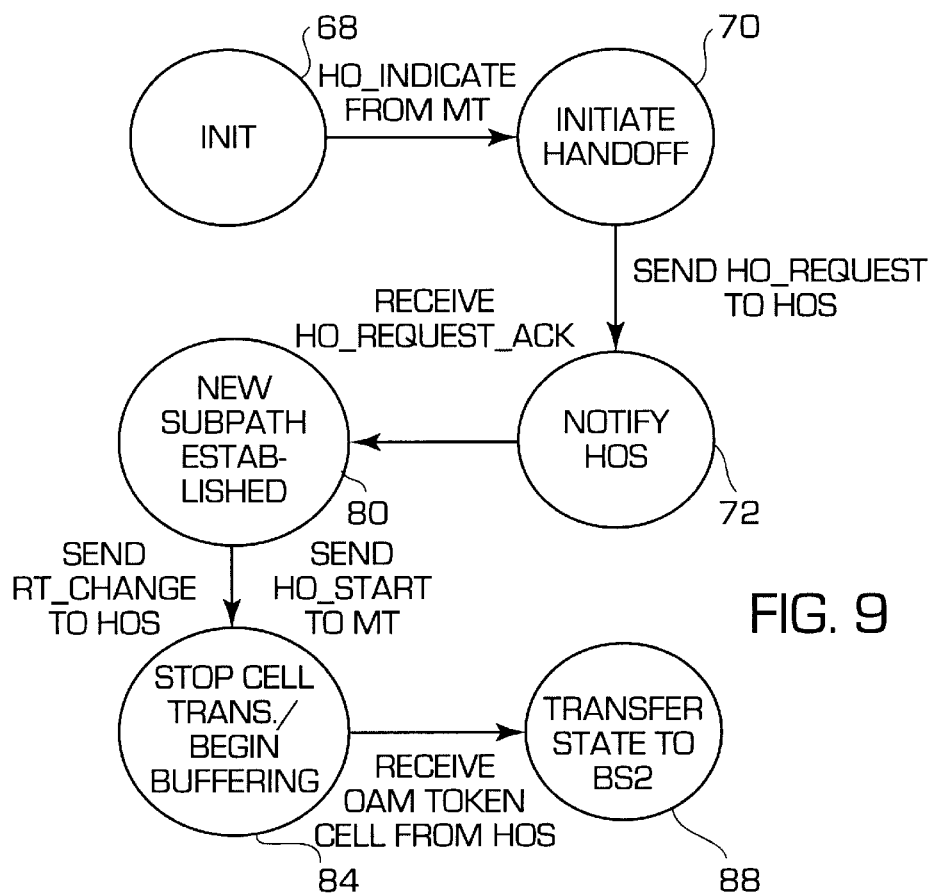
FIG. 9
FIG. 10
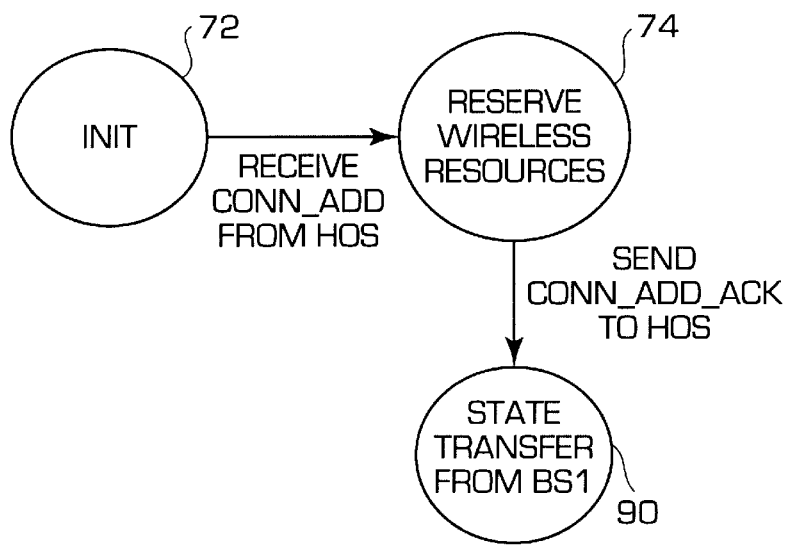

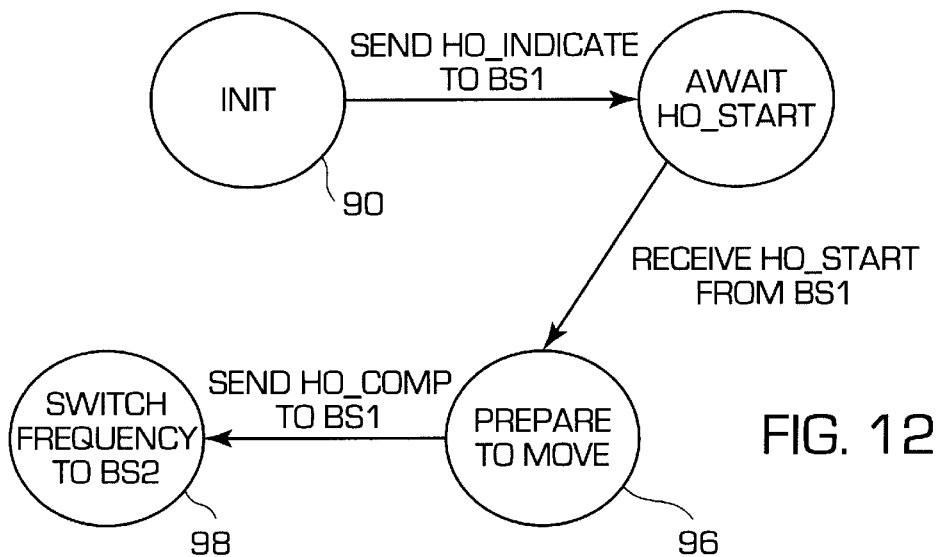
FIG. 12
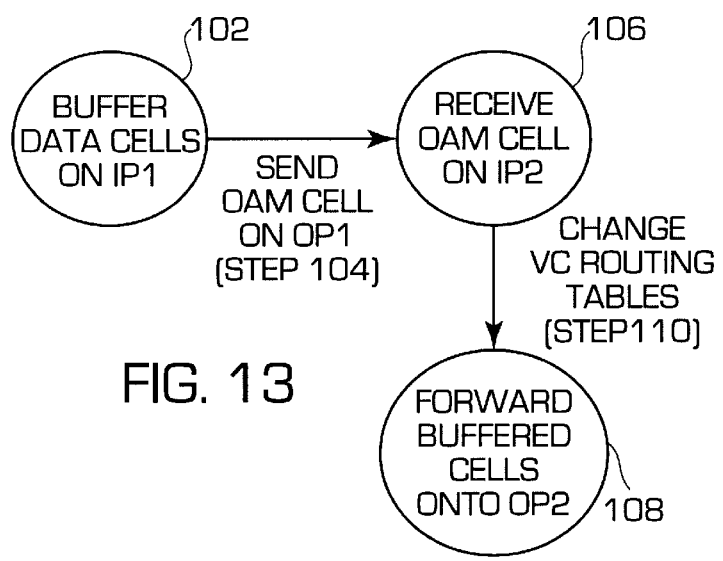
FIG. 13
FIG. 14
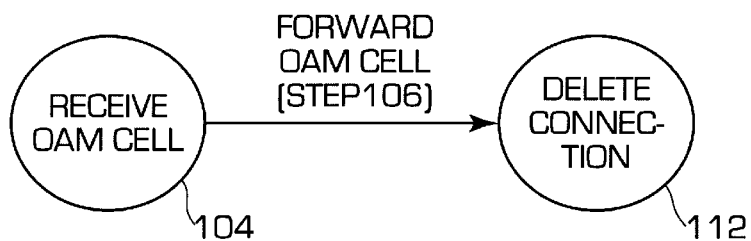

HANDOFF-CONTROL TECHNIQUE FOR WIRELESS ATM

FIELD OF THE INVENTION

The present invention relates to a signaling framework for supporting mobility in a wireless ATM network. Specifically, the invention refers to wireless control protocols for handoff between base stations and mobile terminals.

BACKGROUND OF THE INVENTION

ATM technology is playing an increasingly important role in future broadband networks and it is expected that there will be an emergence of "wireless ATM" networks enabling multimedia access for mobile end systems. Consequently, mobility support in an ATM network assumes increasing importance.

Wireless personal communication services (PCS) and broadband networking for delivery of multimedia information represent two well-established trends in telecommunications. While technologies for PCS and broadband communications have historically been developed somewhat independently, harmonization into a single architectural framework is motivated by an emerging need to extend multimedia services to portable terminals, as well as by service integration and operational efficiency considerations. Now that ATM is viewed as a universal base technology for broadband networks, it is reasonable to consider extension of standard ATM services into next-generation microcellular wireless/PCS scenarios. D. Raychaudhuri and N. D. Wilson, in an article entitled "ATM-Based Transport Architecture for Multiservices Wireless Personal Communication Networks," IEEE Journal on Selected Areas of Communications, vol. 12, no. 8, 1994, pp.1401–1414 and in an article entitled "Multimedia Transport in Next Generation Personal Communication Networks," Proc. of ICC, May 1994, pp. 858–862, propose an architecture for "wireless ATM" in which broadband services are extended over shared radio channels via incorporation of suitable medium access control (MAC) and data link control (DLC) layers into the standard ATM protocol stack. Medium access control is the subject of U.S. patent application Ser. No. 08/495, 164 entitled "Multiservices Medium Access Control Protocol for Wireless ATM System" and data link control is the subject of U.S. patent application Ser. No. 08/553,168 entitled "Data Link Control Protocols for Wireless ATM Access Channels," both assigned to the same assignee as the present invention, and both incorporated herein by reference. The present invention concerns the related signaling, syntax and protocols required to support mobility in such a wireless ATM system. While some early work on the handoff aspects has been reported by A. Acampora and M. Nahshineh in an article entitled "An Architecture and Methodology for Mobile-Executed Handoff in Cellular ATM Networks," IEEE Journal on Selected Areas of Communications, vol. 12, no. 8, pp. 1365–1375, 1994 and by L. V. Hauwemeiren et al in an article entitled "Requirements for Mobility Support in ATM," Proc. of Globecom, 1994, pp. 1691–1694, further conceptual development is required to define a complete framework for handoff control in ATM.

Once a connection has been established between a source and a terminal, current protocols assume that the connection paths does not change during the period of a communication lifetime. This assumption is invalid when the terminal is a mobile terminal. In such cases, special handoff protocols are required.

The key issues in the design of efficient handoff protocols are:

1. During the re-routing of active connections, it is necessary to insure that minimal cells are lost.
2. Determination of an optional cross-over joint (from where to re-route an existing connection to the new mobile terminal) is crucial to the quality of the re-routed connection.
3. Before a mobile terminal can change, it is necessary to determine that the quality of service (QOS) contacts for the existing connection can be met at the new terminal, i.e. the call admission control (CAC) module is ready to accept the re-routed connection.
4. A mobile terminal may have multiple active connections to one or more terminals where it is handed off. The connection can either be re-routed indirectly or may be re-routed/extended as a group.

The present invention provides efficient handoff techniques to support mobility within an ATM network. As an ATM signal is handed off from a first mobile terminal to a second mobile terminal, there is either a partial path re-routing of the signal from a source to the second mobile terminal or there is a path extension to the second mobile terminal.

U.S. Pat. No. 5,487,065 entitled "Method and Apparatus for Supporting Mobile Communications in Asynchronous Transfer Mode Based Networks" describes an ATM based network where the handoff is distributed, as contrasted with centralized. A communication route is determined which includes a connection from a base station via a switching node. A connection tree is determined to include potential connection from other base stations to the switching node. When the mobile user moves from one cell to another, corresponding to a change in base stations within the connection tree, the call is automatically handed over or rerouted to another route within the connection tree. The present invention does not require the creation of a static connection tree, and instead, dynamically extends or re-routes to an existing connection as the mobile endpoint changes its location.

SUMMARY OF THE INVENTION

The present invention concerns handoff techniques to support terminal mobility within an ATM network.

After a connection has been established to a mobile endpoint, handoff protocols are necessary to reroute existing active connections when the endpoint moves to a different radio port. The goal is to minimize latency, cell loss and maintain efficient use of network resources and QOS for the dynamically re-routed cell.

A first preferred method is referred to as partial path re-routing. This method is based on removing a portion of the existing connection and adding a new sub-path from the point of detachment to the mobile terminal. After the mobile terminal is handed off, the portion of the existing connection from the handoff switch to the original mobile terminal is replaced by a new subpath from the handoff switch to the new mobile terminal which is created and spliced to the original connection from the source to the handoff switch. This protocol is described generally in an article by R. Yuan et al entitled "A Signaling and Control Architecture for Mobility Support in Wireless ATM Network," Proc. of ILC, June 1996.

A second preferred method is referenced to as path extension. This method extends an active connection from the previous mobile terminal to the new mobile terminal.

The method is that after handoff, the new connection includes the existing connection from the source to a mobile terminal followed by an additional sub-path (extension) from the mobile terminal to the new mobile terminal.

The invention will be best understood when the following description is read in conjunction with the accompanying drawing.

BRIEF DESCRIPTION OF THE DRAWING

FIG. 9 is a state transition diagram for an initial base station during handoff in accordance with a preferred embodiment of the invention;

FIG. 10 is a state transition diagram for a subsequent base station during handoff in accordance with a preferred embodiment of the invention;

FIG. 12 is a state transition diagram for a mobile terminal during handoff in accordance with an alternative preferred embodiment of the invention;

FIG. 13 is a state transition diagram for loop removal of looping point (HOS) during handoff in accordance with an alternative preferred embodiment of the invention;

FIG. 14 is a state transition diagram for loop removal at an initial base station during handoff in accordance with an alternative preferred embodiment of the invention;

DETAILED DESCRIPTION OF THE INVENTION

Figure 1:
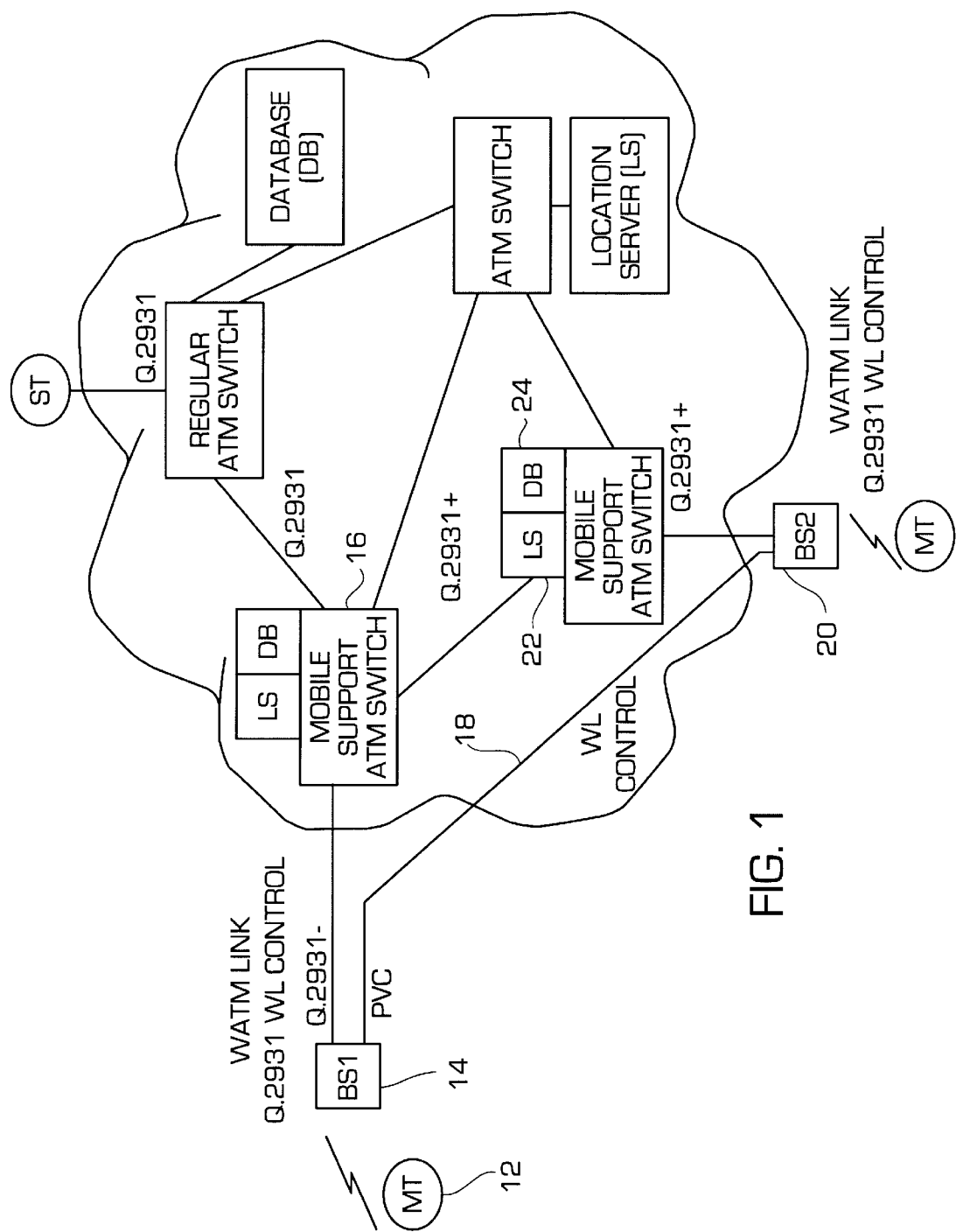
FIG. 1 is a network diagram of a typical ATM network that supports mobility.

Referring now to the figures and to FIG. 1 in particular, there is shown a network diagram that illustrates the various network components and functions that may comprise an ATM network that supports mobility. That is, a wireless ATM network intended to support integrated broadband services to mobile terminals.

As shown in FIG. 1, the mobile terminal is a complete ATM end systems that is capable of supporting multimedia applications. It uses a standard ATM signaling protocol (Q.2931, ATM forum UNI3.1) for connection establishment between end systems. The wireless link between a mobile terminal (MT) 12 and base station (BS) 14 provides the desired ATM transport services to the mobile terminal. A mobility enhanced signaling protocol based on the ITU recommendation Q.2931 (termed Q.2931+) is used by the MT, BS and MSS (mobility support switches) 16 to support handoff related functions. In addition, wireless control protocols are used between base stations 14, 20 to facilitate wireless resource management and sequential cell delivery during handoffs. This custom protocol is supported via permanent virtual circuits (PVC) 18 between neighboring base stations 14, 20.

The location registration and resolution functions are performed by the location servers (LS) 22 and database (DB) systems 24 which coexist with the network hierarchy. In the present invention, the location management is decoupled from the connection management system. Such decoupling permits the independent operation and optimization of location updates scheme. It also enables efficient support of the connectionless data service in the network.

Figure 2:
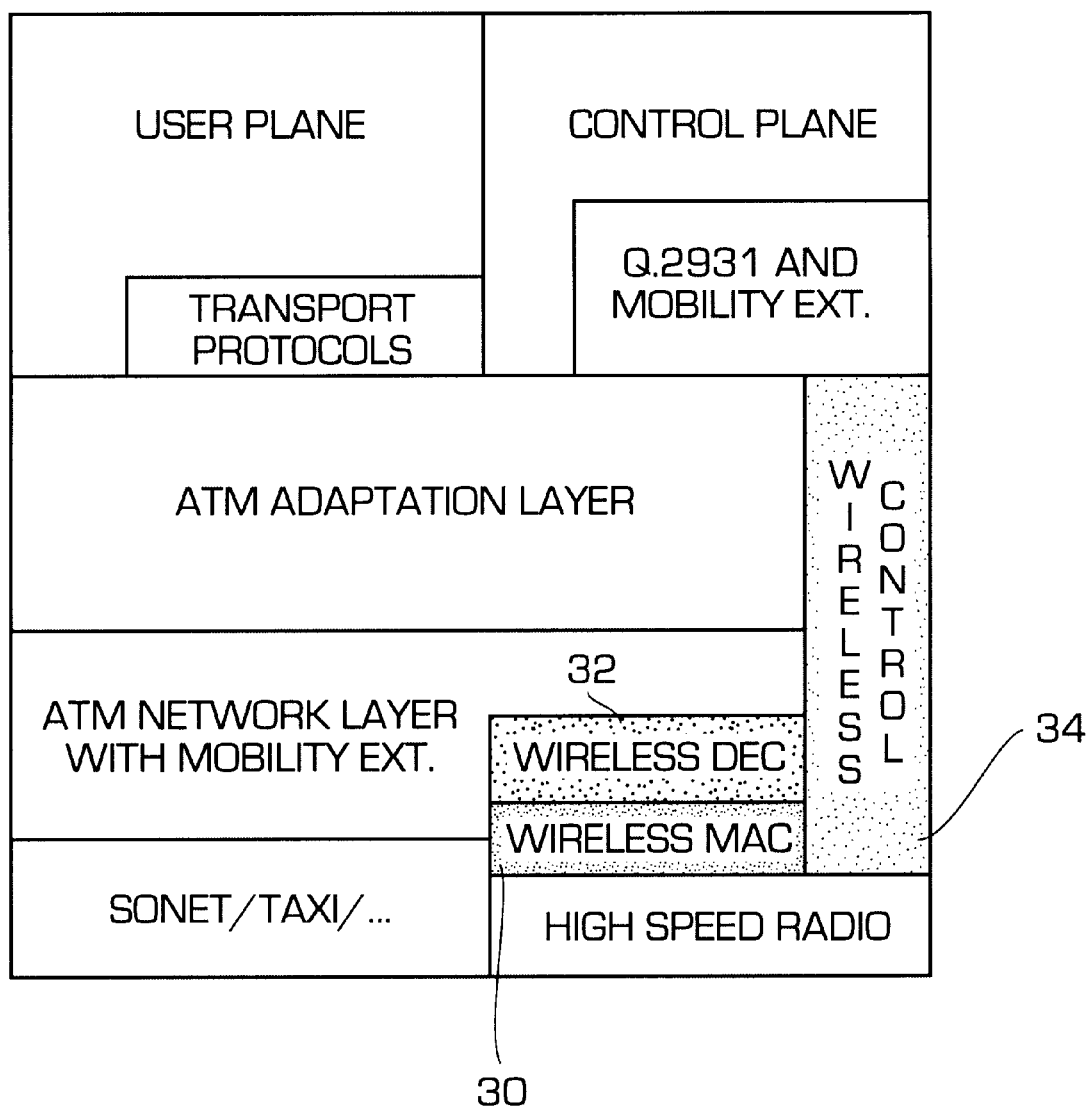
FIG. 2 is a representation of a preferred ATM protocol stack.

The architecture is based on an integration of the wireless and mobility specific functions into the standard ATM protocol stack. The user plane and control plane are shown in FIG. 2 where the wireless MAC (medium access control) 30, wireless DLC (data link control) 32 and wireless control 34 represent new layers added for wireless ATM support. The function of wireless MAC and wireless DLC layers is to provide a standard ATM transport service across the shared/unreliable wireless (radio) channel. The wireless control protocol supports management functions at these layers, while interfacing with higher layer (ATM) control functions.

Figure 3:
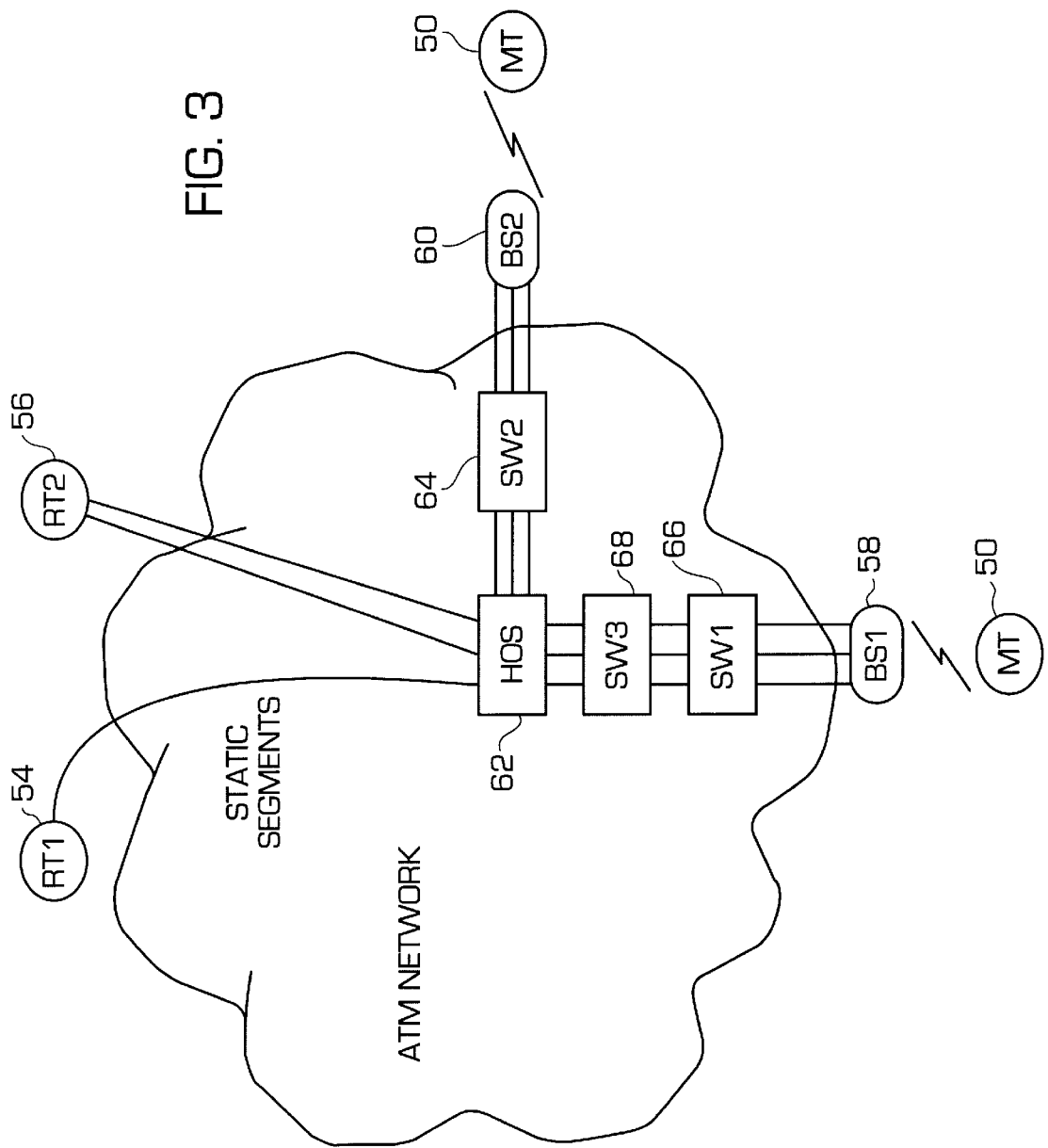
FIG. 3 is a diagram illustrating VC segmentation and rerouting.

In an ATM network, the end-to-end virtual connection is constructed by link-by-link VCs connected through different network switches. The handoff of a mobile terminal between different base stations is the dynamic reconfiguration of the end-to-end VCs under the constraint of QOS requirements of the connections. To simplify the approach, the end-to-end VCs are separated into two segments: the static and dynamic segments (note that in the case of connection between two MTs, the end-to-end VC may be separated into three segments, but from the perspective of one MT during re-configuration, the two segments scenario still applies). Such an arrangement is shown in FIG. 3, where a mobile terminal MT 50 has three active connections from two remote terminals (RT) 54, 56, one from RT1 54 and two from RT2 56. When the MT migrates from the coverage area of BS1 58 into the coverage area of BS2 60, these connections are reconfigured by creating three new segments from the handoff switch (HOS) 62 to BS2 60 via switch SW2 64, and changing the VC routing table at the HOS 62. This is applicable as well to the concept of VC grouping, where active connections of the MT are grouped and reconfigured in a collective manner.

The Hand-Off Switch (HOS) is the mobility supporting switch that anchors the entire handoff process. By cooperating with BS1 58 and BS2 60, the HOS 62 establishes a group of new dynamic segments and then connects them with the original static segments.

Figure 4:
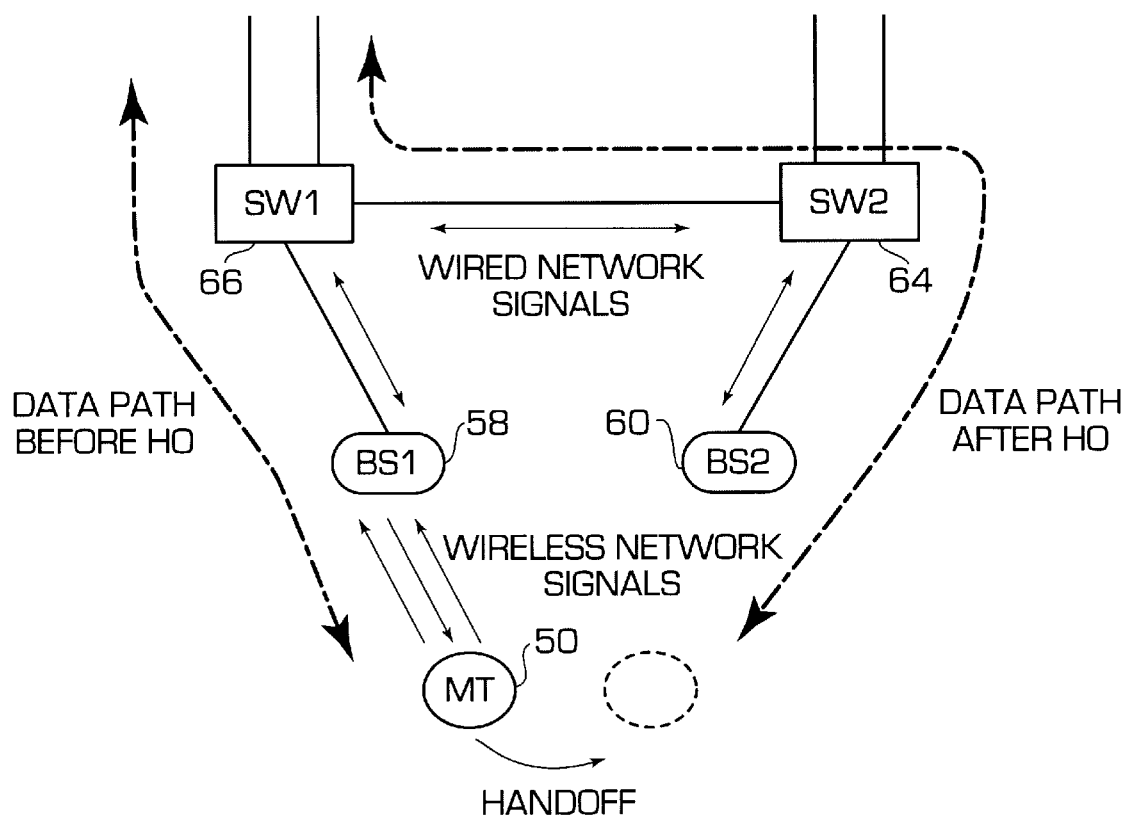
FIG. 4 is an illustration of a typical inter-switch handoff.

A general inter-switch handoff arrangement is shown in FIG. 4. As the mobile terminal 50 migrates away from BS1 58 and towards the cell coverage area of BS2 60, the mobile terminal listens to the beacon signals from both base stations. The mobile terminal can suggest when to initiate a handoff from BS1 to BS2 based on its measurements of the BS beacons. The mobile terminal sends an HO_INDICATION signal to the base station using the wireless control protocol between MT 50 and BS 58. The HO_INDICATION signal includes multiple potential handoff candidates.

Upon receiving the HO_INDICATION signal from the mobile terminal, BS 1 58 uses the wireless control protocol between base stations to contact the handoff candidate base stations through the PVC established between base stations. In this example, the primary candidate BS2 60 acknowledges the availability of resources.

After receiving the acknowledgment from BS2, BS 1 sends an HO_REQUEST message to the handoff switch. The selection of the HOS can be based on the route optimization for the multiple connections and a series QOS requirements. It is also possible to have multiple HOSs handle multiple connections. However, for implementation simplicity, it is assumed there is only one HOS. The HOS then establishes a datapath to the targeted base station via the fixed network signaling scheme (Q.2931+). After the alternate datapath is established, the HOS sends a HO_REQ_ACK message to BS1 58.

Assured of the establishment of an alternate datapath, BS1 sends a HO_START message to the mobile terminal through the wireless control channel. In the meantime, it sends a RT_CHANGE signal to the switch to instruct the switch to change the datapath from the original to the newly established connections via switch 64 instead of via switch 66. After receiving the HO_START from BS1 58, the mobile terminal changes its operating frequency and starts communicating through BS2 60. From the description above, the handoff procedures may be summarized as follows:

New base station 60 (BS2) identification. Both the mobile terminal 50 and the base stations 58, 60 can coordinate the selection. Usually, a BS beacon serves the purpose of base station identification and SIR/BER measurement.

HOS selection. The handoff switch can be selected based on the route optimization from multiple connections and a series of QOS considerations. The easiest selection is the current switch serving the mobile terminal. This is the switch where all the connections to the mobile terminal transit. The possibility that another mobile terminal within the same base station coverage can establish a connection to MT 50 directly through the base station without involving the switch is excluded.

New mobile segments establishment. A group of new mobile segments are established together between HOS 62 and BS2 60, and BS2 can allocate the wireless resources for the mobile terminal before actual handoff.

VC rerouting. The HOS 62 reroutes the connections by connecting the original static segments with the new mobile segments. At the same time, BS1 58 instructs the mobile terminal to switch to the new base station.

Cell resequencing. The old base station transfers the wireless datalink states information to the new base station. This guarantees the in-sequence delivery of ATM cells.

Route optimization. Optionally, the route optimization can be treated separately from the handoff process, as long as the HOS provides reasonable robustness to avoid obvious loops.

Figure 5:
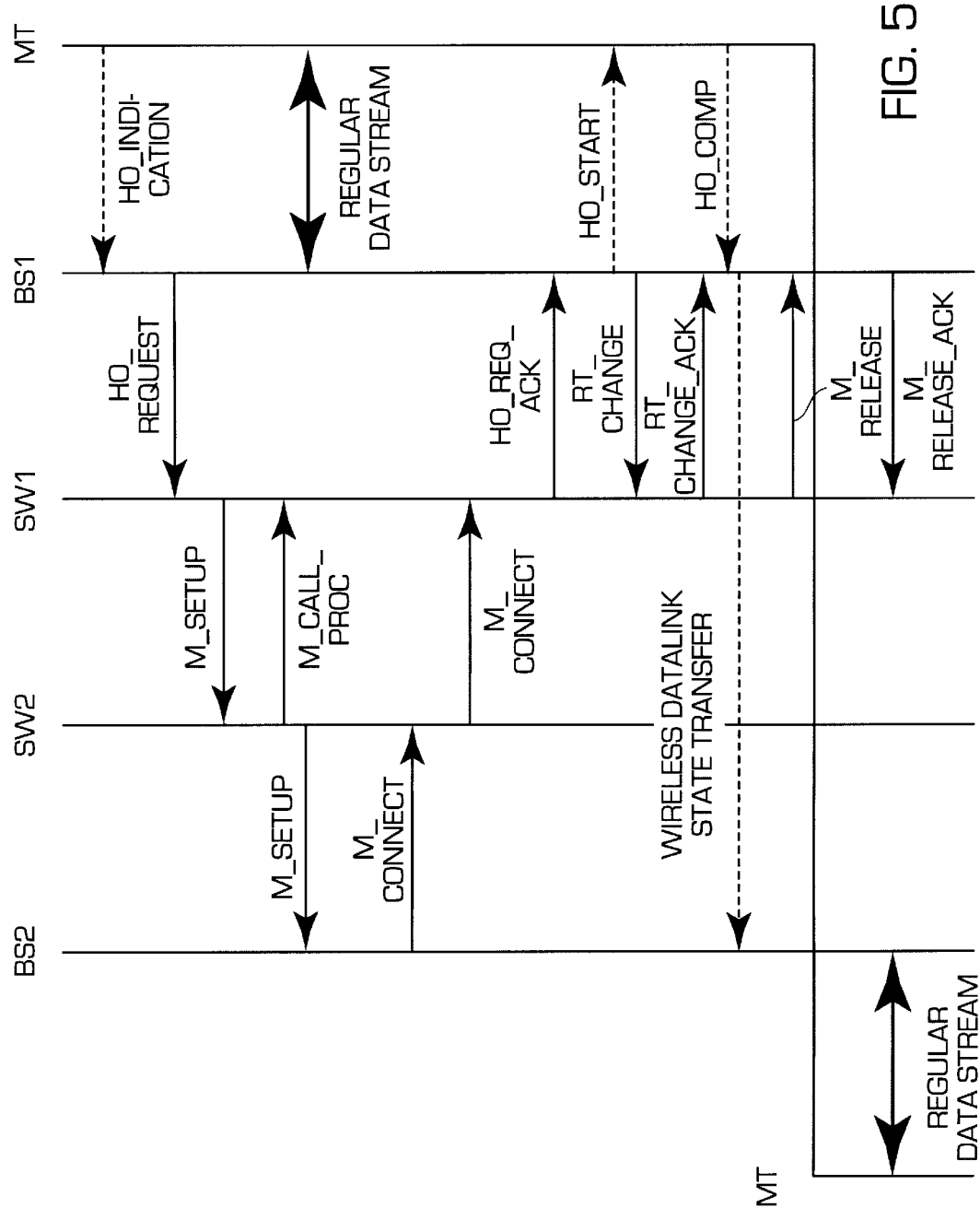
FIG. 5 is a graphical representation of the signal flow during the handoff process.

In the above inter-switch handoff example, SW1 66 acts as the HOS, the signaling flow during the handoff process is shown in FIG. 5. Several signal messages are used to achieve the MT handoff between the two base stations. However, current ATM signaling protocol standard does not have the mobility support functions. Thus, several extensions to the ATM signaling protocols are disclosed to facilitate mobility support in an ATM network. Table 1 is a list of the extension signals, their functionalities and the information elements (IE).

TABLE 1

| Signal Message | Functions | Information Elements |
| --- | --- | --- |
| HO_REQUEST | Request HOS to initiate the handoff process | MT address, new BS address, multiple connection identifiers |
| HO_REQ_ACK | Acknowledges HO_REQUEST | MT address, new BS information, MT, address and new ID, multiple connection identifiers |
| M_SETUP | Establish multiple connections | MT address, new BS address, multiple connection identifiers and parameters |
| M_CALL_PROC | Indicate the reception of M_SETUP | MT address, multiple connection identifiers |
| M_CONNECT | Acknowledge M_SETUP | MT address, new ID, multiple connection identifiers and parameters |
| RT_CHANGE | Request change of routing table at HOS | Multiple connection identifiers, MT address |
| RT_CHANGE_ACK | Acknowledge RT_CHANGE | MT address |
| M_RELEASE | Request releasing multiple single hop connections | Multiple connection identifiers |
| M_RELEASE_ACK | Acknowledges M_RELEASE | Multiple connection identifiers |
| RENEGOTIATION | Renegotiation service/QOS parameter | Connection identifier, old service/QOS parameters, new service/QOS parameters |
| CONNECT* | Establish connection with requested/fallback service/QOS parameters | Connection identifiers, requested service/QOS parameters, offered service/QOS parameters |

*Modified signaling message

The issue of backward compatibility arises when communication links between HOS and the base station transit through other regular ATM network switches. In the example described in conjunction with FIG. 3, the HO_REQUEST message transits through SW3 68. If SW3 68 is a regular network switch that does not support mobility extensions, it is difficult for the HO_REQUEST to function transparently across SW3. If SW3 has mobility support extensions, it can interpret the message and issue a similar HO_REQUEST to HOS 62 with different connection identifier and call reference values. It is assumed that HOS 62 communicates directly with BS1 58, and all network switches support mobility.

Another signaling function of importance in the mobile arrangement is that of service parameter and QOS specification and renegotiation in the presence of heterogeneous/variable radio channel bandwidth. When an ATM call is established to a mobile terminal, the available service parameters may be lower than that requested in the connection message. Most often this is due to radio channel limitations. In such a case, a suitable "fallback" mechanism which sets up a connection with the highest available bandwidth parameters is needed. This type of fallback function is useful in conventional fixed network scenarios as well, although it is not specified in the current ATM Forum UNI specification. For mobile terminals which operate in highly variable environments, the provision of a CONNECT (..., new service parameters, ...) message in response to a SETUP (..., service parameters, ...) message is possible.

In addition to service parameter fallback at call setup, mobile terminals encounter variable service availability due to handoff migrations. For example, a mobile operating CBR connection at 2 Mbps might find that only 1.5 Mbps is available in the new microcell after handoff. In this case, a suitable RENEGOTIATE (..., service parameters, ...) syntax is required to provide for in-call adjustment of service parameters. This type of capability is useful in fixed networks as well as a robust mechanism for dealing with congestions, outage, etc. For a wireless ATM arrangement, this renegotiation capability is viewed as extremely important since frequent handoff events will otherwise result in relatively high call termination rates. Of course, not all applications will be able to operate over a range of bit-rates, but it is anticipated that well-designed mobile software applications will incorporate such capabilities.

QOS specification is another important aspect to be considered in mobile ATM. Current ATM signaling provides for QOS specification in the standard SETUP message, but does not specify how this QOS budget is to be allocated between each segment of the route. In the wireless scenario, a larger QOS degradation budget (i.e. CDV, CLR or delay) needs to be allocated to the wireless link in view of intrinsic radio channel characteristics, and performance implications of MAC and DLC protocols used on the access link. For example, if a total delay budget of 30 ms is specified, it might be appropriate to allocate 20 ms to the radio link and 10 ms to the fixed network segment, thus permitting the use of relatively powerful DLC modes for low CLR. Thus, it may be useful to augment current ATM syntax to specify a partition of QOS between wired and wireless network segments. Once again, this type of capability is needed in fixed ATM as well, particularly when dealing with heterogeneous link speeds and switch buffer sizes. One mechanism is to extend current SETUP syntax to include both total and next hop QOS values. Note that as discussed above for service parameters, renegotiation of QOS during handoff is also an important feature for the mobile ATM scenario.

Figure 6:
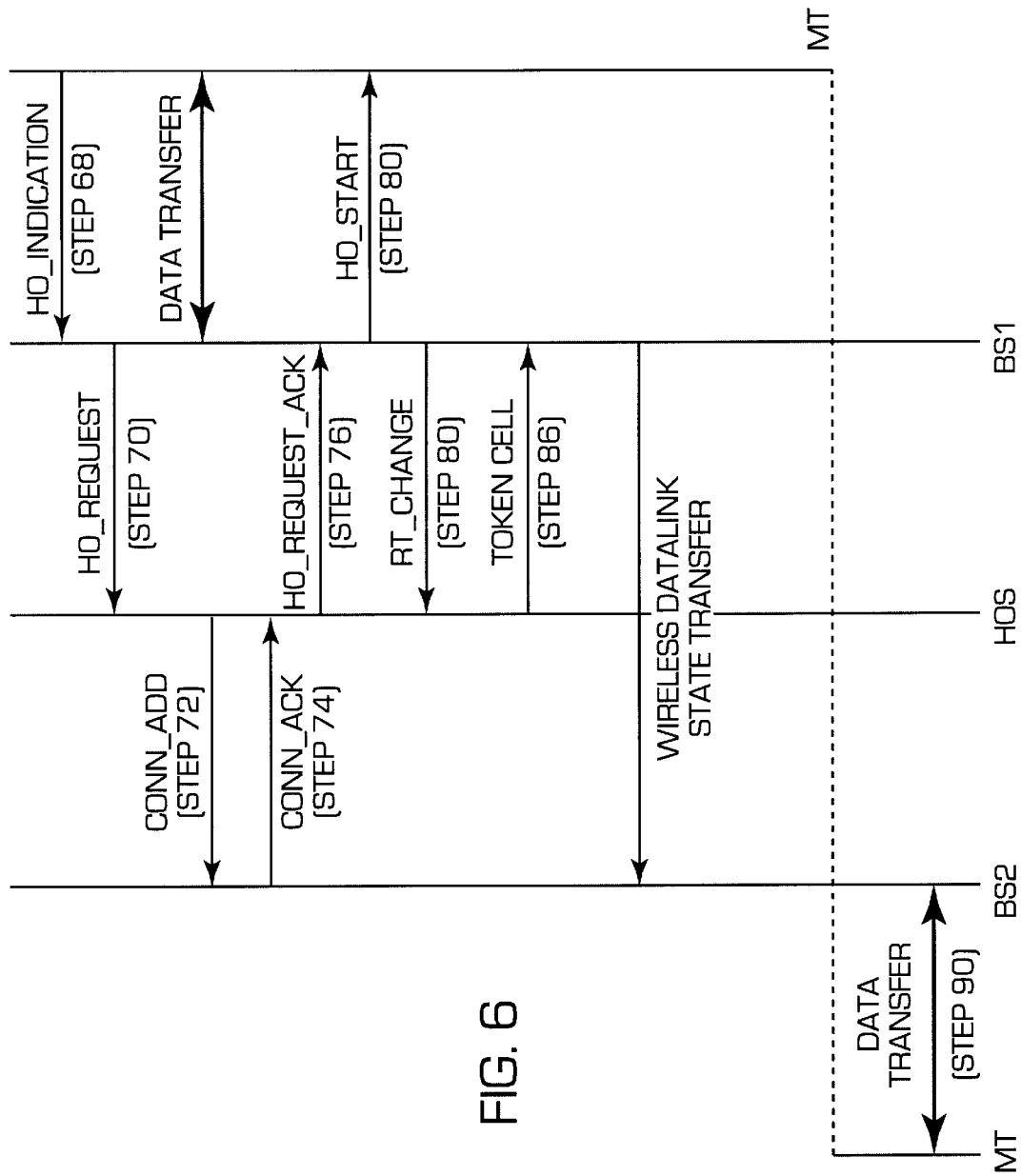
FIG. 6 is a schematic representation of the signaling messages during handoff in accordance with a preferred embodiment of the invention.
Figure 7:
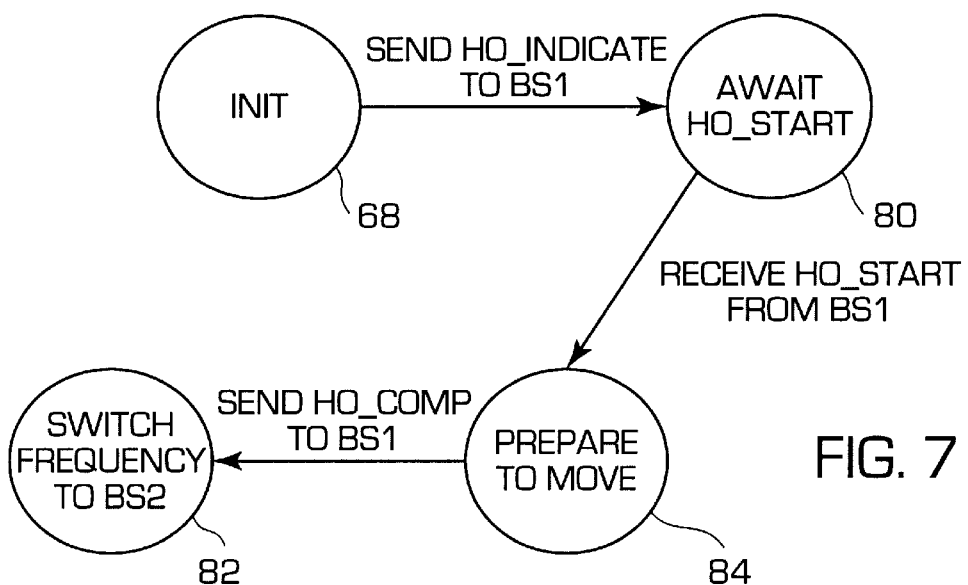
FIG. 7 is a state transition diagram for a mobile terminal during handoff in accordance with a preferred embodiment of the invention.
Figure 8:
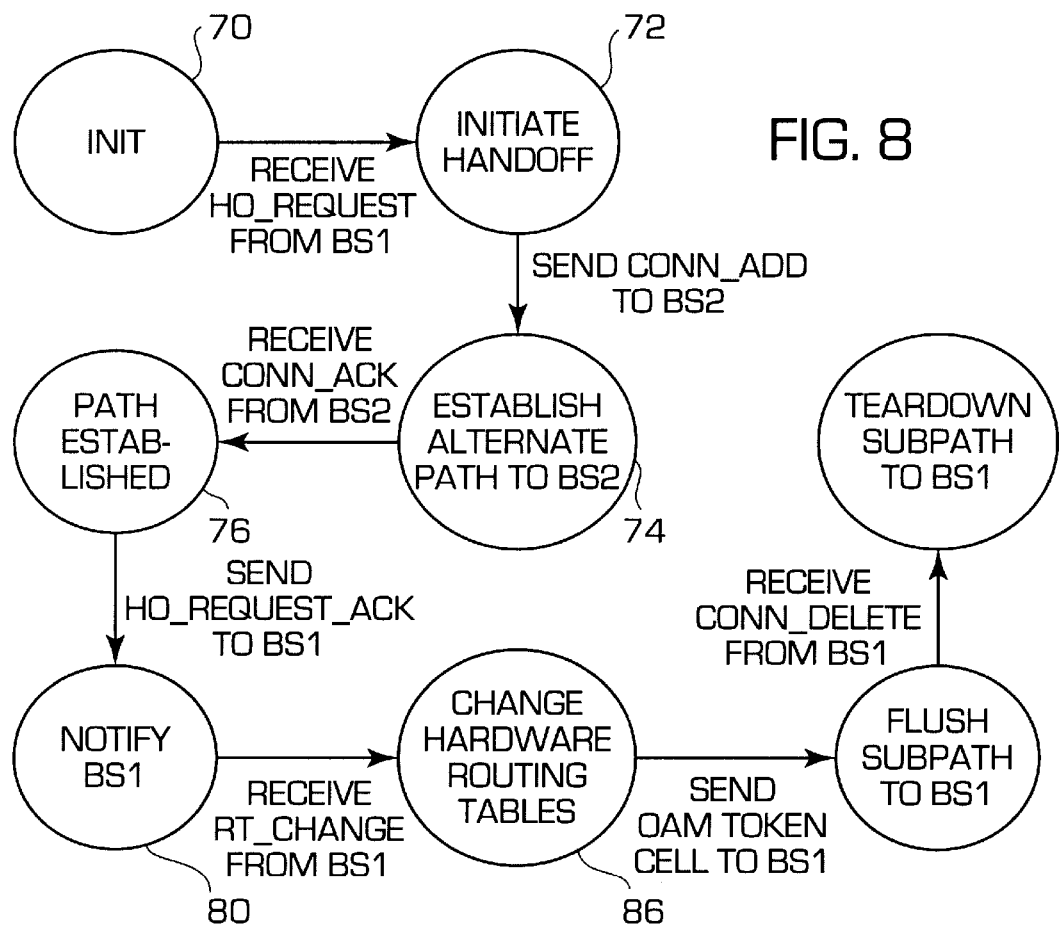
FIG. 8 is a state transition diagram for a handoff switch during handoff in accordance with a preferred embodiment of the invention.

A more detailed description of a preferred path rerouting method will now be described. The method (referring to FIG. 3) is based on the idea that when a mobile endhost MT moves from base stations BS1 58 to BS2 60, then an existing connection between MT 50 and a remote terminal RT 54, 56 is rerouted at an intermediate switch 62, called the handover switch (HOS). The connection is rerouted at the HOS 62 by adding a subpath from HOS to BS2 60 and deleting the subpath from HOS to BS1 58, followed by a transfer of buffered cells from BS1 to BS2. Referring now to FIGS. 6 to 10 where FIG. 6 shows the signaling messages during handoff. FIGS. 7, 8, 9 and 10 are state transition diagrams for the mobile terminal to be handed off, the handoff switch, an initial base station (BS1) and a subsequent base station (BS2), respectively. The same numerals are used for the same sequential step in each figure.

BS1 sends a HO_REQUEST(conn-id) message to HOS (step 70) to initiate rerouting of the connection identified by conn-id, using appropriate extensions to the NNI signaling standards.

The HOS sends a connection setup signaling message CONN_ADD(conn_id) to BS2 (step 72), creating the subpath from HOS to BS2 for the connection conn_id.

BS2 responds with a CONN_ACK(conn_id) signaling message to HOS (step 74), if the subpath was setup successfully. BS2 also reserves buffer space to hold incoming cells on the subpath. The buffer space is released after the handoff is complete.

HOS sends a HO_REQUEST_ACK(conn_id) signaling message to BS1 (step 76).

MT sends a HO_INDICATE signaling message to BS1 (step 68).

Upon receiving the HO_REQUEST_ACK message, BS1 sends a HO_START(conn_id) signaling message to MT (step 80), stops transmitting data cells, and sends a RT_CHANGE signal to HOS (step 80).

MT switches its operating frequency to that of BS2 after receiving HO_START from BS1 (step 82). It can optionally send a HO_COMPLETE message to BS1 before switching frequencies (step 84).

After receiving the RT_CHANGE message, HOS changes its hardware routing tables so that the cells on connection conn are routed to BS2 via the newly established subpath (step 86) and sends a OAM ("token") cell on the existing subpath towards BS1 (step 86).

After receiving the token cell, BS1 transfers the wireless datalink state for the connection conn_id to BS2 (step 88).

BS2 'splices' the received datalink state with its buffered state, and transmits cells to MT1 in sequence (step 90).

Figure 11:
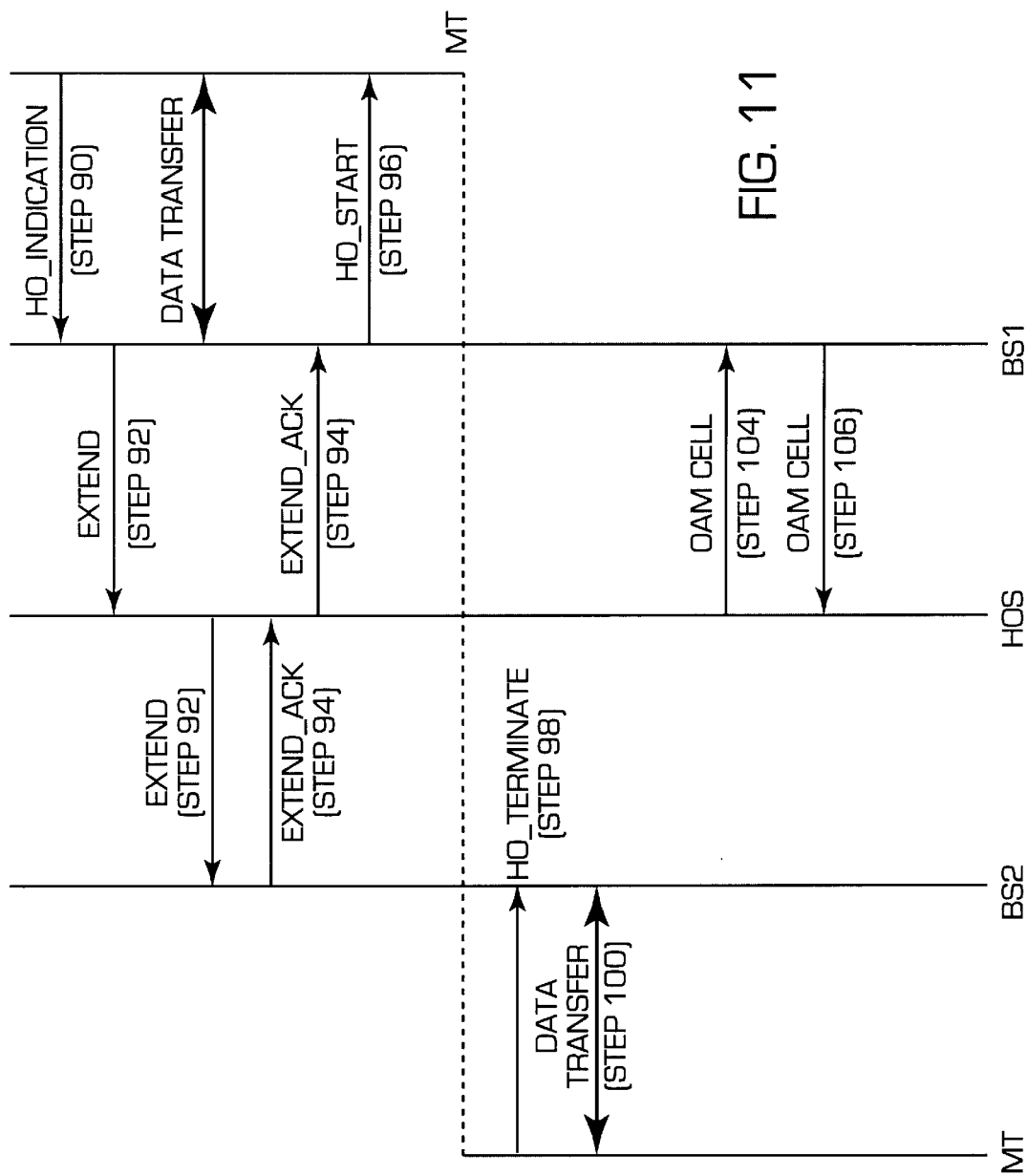
FIG. 11 is a schematic representation of the signaling messages during handoff in accordance with an alternative preferred embodiment of the invention.
Figure 15:
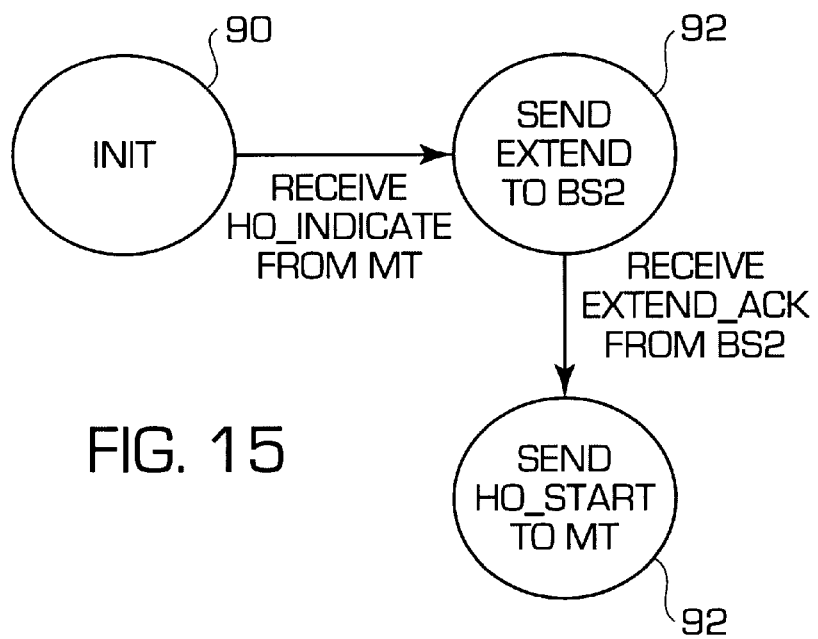
FIG. 15 is a state transition diagram for an initial base station during handoff in accordance with an alternative preferred embodiment of the invention.
Figure 16:
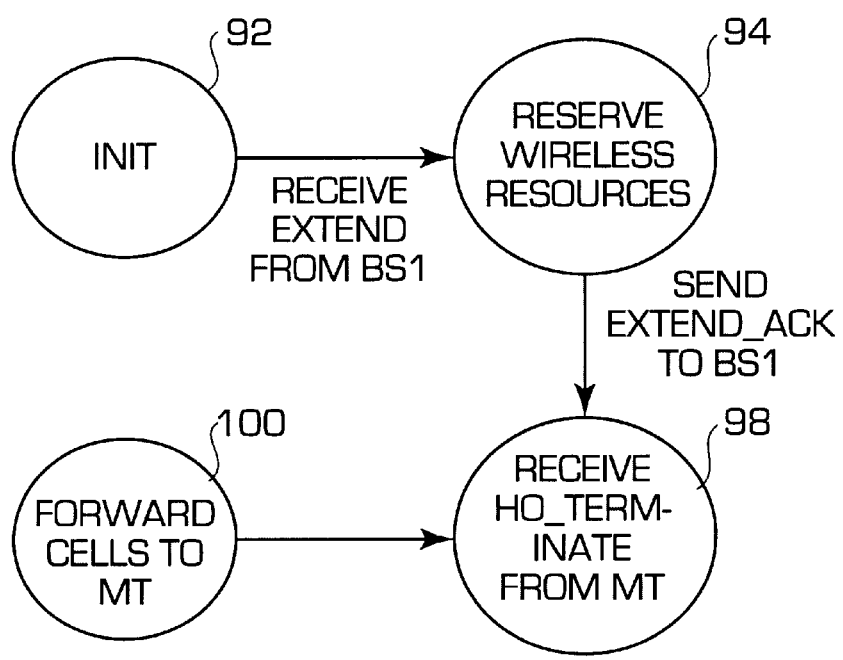
FIG. 16 is a state transition diagram for a subsequent base station during handoff in accordance with an alternative preferred embodiment of the invention.

An alternative preferred path rerouting method involves path extension with lazy optimization. Referring now to FIGS. 11 to 16, where FIG. 11 shows the signaling messages during handoff. Lazy optimization refers to the fact that the path can be optimized by eliminating duplicate or unnecessary paths by removing loops after handoff. FIGS. 12, 13, 14, 15 and 16 are state transition diagrams for the mobile terminal to be handed off, the loop removal at looping point (Hand Off Switch), the loop removal at the initial base station (BS1), the initial base station (BS1) itself, and the subsequent base station (BS2), respectively. The same numerals are used for the same sequential step in each figure.

The path extension with lazy optimization handoff scheme is based on two principal concepts. First, extending an existing connection (to the mobile MT) from the previous base station (BS1) to the current base station (BS2) after a cell switch and second, removal of loops in the augmented connection performed using in-band OAM cells in a lazy manner after the MT has started to send and receive cells from BS2.

The signals and steps involved in the handoff process are as follows:

MT sends a HO_INDICATION signaling message (step 90) to BS1 indicating BS2 to be its next base station.

BS1 sends an EXTEND(conn id) signaling message to BS2 (step 92), thereby extending the current connection with BS1.

BS2 replies with an EXTEND_ACK(conn_id) if the connection would be successfully extended (step 94). At this point BS2 allocates buffer space to hold incoming cells on the extended connection, until MT switches its operating frequency to that of BS2.

BS1 then stops transmitting cells on its wireless link to MT (step 96), asking it to switch its operating frequency to that of BS2.

MT switches its frequency and sends a HO_TERMINATE signaling message to BS2 (step 98).

BS2 starts to forward cells from the extended connection on the wireless link to MT (step 100).

A second sequence of steps is executed after the handoff is completed to remove potential loops in the augmented connection. A switch detects that there is a looping point in the augmented connection by examining entries in the connection routing tables. If there are two entries for the same connection, then the switch is a looping point. The switch HOS is a looping point since its connection table contains two distinct entries for the same connection conn__id: <IP1, OP1>, <IP2, OP2>.

The first entry has its input port (IP 1) as the link between RT and HOS and the output port (OP 1) as the link from the HOS to BS1. The second entry has the link between BS1 and HOS as its input port (IP2), and the link between HOS and BS2 as its output port (OP2). See, for example, FIG. 3.

In the example, OP1 and IP2 are the same link, but in general that need not be the case. The looping point is detected during the process of path extension, i.e. when a switch receives and processes the EXTEND message.

The loop elimination procedure is initiated by the looping point after the MT has begun to receive cells from the new base station. This can be inferred by the looping point (the hand-off switch, HOS) by observing when cells begin to flow across both pairs of input-output ports, corresponding to the connection conn__id. At this time, the looping point (HOS) begins to buffer cells on the input port (IP1) corresponding to the beginning of the loop (step 102); sends at OAM cell on the output port (OP1), corresponding to IP1 (step 104); receives the OAM cell back on IP2 (step 106); forwards the buffered cells onto OP2 (step 108); changes its hardware routing tables (VPI/VCI entries) to route incoming cells on IP1 onto OP2 (step 110); and merges the two connection table (software) entries into a single entry <IP1, OP2>.

When each intermediate switch in the loop receives the OAM cell (sent by the looping point) it forwards the OAM cell on the corresponding output port. Then, it deletes that connection (step 112) and releases all resources used for the connection.

While there has been described and illustrated a preferred and an alternative preferred handoff control method for wireless ATM, it will be apparent to those skilled in the art that further variations and modifications are possible without deviating from the broad principles and spirit of the present invention, which shall be limited solely by the scope of the claims appended hereto.

What is claimed is:

1. A method for mobile-communications connections and routing in a network including base stations, a mobile terminal, a remote terminal, switches, a hand-off switch and first and second datapath links, comprising the steps of:
    establishing a communications connection from said remote terminal to said mobile terminal via said first datapath link, including said hand-off switch, a first switch, and a first base station;
    signaling from said mobile terminal to said first base station when a hand-off is to occur;
    signaling from said first base station to a second base station via said second datapath link and a second switch requesting a hand-off;
    signaling from said second base station to said first base station that said second datapath link from said hand-off switch to said second base station via said second switch is available;
    signaling from said hand-off switch to said first switch and said second switch to change datapath links from said first datapath link to said second datapath link; and
    signaling from said first base station to said mobile terminal to change communications from said first base station to said second base station.

2. A method for mobile-communications connections and routing in a network including base stations, a mobile terminal, switches, and first and second datapath links, comprising the steps of:
    establishing a communications connection from said remote terminal to said mobile terminal via said first datapath link including a first switch and a first base station;
    signaling from said mobile terminal to said first base station when a hand-off is to occur;
    signaling from said first base station to a second base station via said second datapath links including a second switch, a request for said hand-off while establishing said second datapath link from said first base station to said second base station via said first switch and said second switch;
    signaling from said second base station to said first base station that said second datapath link is established; and
    signaling from said first base station to said mobile terminal to change communications from said first base station to said second base station and sending data from said first base station to said second base station via said second datapath link.

3. A mobile-communications connections and routing network comprising:
    a communications connection from a remote terminal to a mobile terminal via a first datapath link including a hand-off switch, a first switch, and a first base station, and mobile terminal signaling to said first base station when a hand-off is to occur; and
    a second base station receiving a signal from said first base station via a second datapath link, including a second switch, a request for said hand-off, said second base station signaling to said first base station when said second datapath link from said hand-off switch to said second base station via said second switch is available; wherein
    said hand-off switch signals said first switch and said second switch to change datapath links from said first datapath link to said second datapath link; and
    said first base station signaling to said mobile terminal to change communications from said first base station to said second base station.

4. A mobile-communications connections and routing network comprising:
    a communications connection from a remote terminal to a mobile terminal via a first datapath link including a first switch and a first base station, said mobile terminal signaling to said first base station when a hand-off is to occur;
    a second base station receiving from said first base station via a second datapath link, including a second switch, a signal requesting said hand-off while establishing said second datapath link from said first base station to said second base station via said first switch and said second switch;
    said second base station signaling to said first base station that said second datapath link is established; and
    said first base station signaling to said mobile terminal to change communications from said first base station to said second base station and said first base station sending data to said second base station via said second datapath link.

* * * * *